UNITED STATES PATENT OFFICE.

OSKAR UNGER, OF ELBERFELD, GERMANY, ASSIGNOR TO THE FARBENFABRIKEN OF ELBERFELD COMPANY, OF NEW YORK.

GREEN ANTHRAQUINONE DYE AND METHOD OF MAKING SAME.

SPECIFICATION forming part of Letters Patent No. 654,295, dated July 24, 1900.

Application filed January 2, 1900. Serial No. 156. (Specimens.)

*To all whom it may concern:*

Be it known that I, OSKAR UNGER, chemist, doctor of philosophy, residing at Elberfeld, Germany, (assignor to the FARBENFABRIKEN OF ELBERFELD COMPANY, of New York,) have invented a new and useful Improvement in the Manufacture of Green Anthraquinone Dyes; and I do hereby declare the following to be an exact and clear description of my invention.

My new process consists in first causing halogens, such as bromine, to act on alphylalphamonoamidoanthraquinones having the formula:

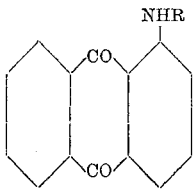

(R meaning an alphyl radical, such as phenyl, tolyl, xylyl, or the like;) secondly, treating the new halogen derivatives with aromatic amines, such as aniline ortho- or para-toluidine, xylidine, or the like, and, finally, transforming the so-obtained condensation products into valuable dyestuff sulfonic acids by the action of sulfonating agents. The new coloring-matters thus obtained are in dry state dark powders soluble in water and in ammonia with a green color, dyeing unmordanted and chrome-mordanted wool fast-green shades.

In carrying out my new process practically I can proceed as follows, the parts being by weight: Ten parts of alphaparatoluidoanthraquinone, which can be produced by the action of alphanitroanthraquinone on paratoluidine, are dissolved in two hundred parts of glacial acetic acid. To the solution thus obtained twenty parts of bromine are added with stirring. The reaction takes place instantly, the temperature of the mixture rising in a considerable degree, while the bluish-red color of the liquid turns into brownish yellow. The brominated product thus produced is then completely separated in the shape of yellowish-red crystals by the addition of water. Finally it is filtered off, dried, and pulverized.

For the production of the above-defined condensation product of the brominated alpha-toluidoanthraquinone with paratoluidine a mixture of ten parts of brominated alpha-toluidoanthraquinone and one hundred parts of paratoluidine is boiled until a test portion dissolves in chloroform with an intense bluish-green color. After the reaction mass has been allowed to cool down to about 60° centigrade it is mixed with one hundred and fifty parts of alcohol, by means of which operation the condensation product is separated. It is filtered off and dried. The reaction product thus produced dissolves in organic solvents with a green color. In order to transform the condensation product thus obtained into a dyestuff sulfonic acid, ten parts of the finely-pulverized condensation product are stirred into a mixture prepared from one hundred parts of sulfuric monohydrate and ten parts of fuming sulfuric acid, (containing twenty per cent. of $SO_3$.) The resulting mixture is then heated at about from 30° to 50° centigrade until a test portion when poured into much water yields a clear solution. Subsequently the reaction mass is poured into five hundred parts of ice-water, and from the mixture thus produced the dyestuff is completely separated by the addition of common salt. It is filtered off and can be used for dyeing either in a pasty state or after previous drying.

When dry and pulverized, the new coloring-matter represents a dark powder soluble in water with a bluish-green color, soluble with difficulty in alcohol with a green color, and being readily soluble in ammonia with a bluish-green color. By concentrated sulfuric acid (of 66° Baumé) it is dissolved, yielding a green solution, the color of which does not change on the addition of a small quantity of ice, while on adding a larger quantity of ice a dark green precipitate is separated therefrom.

The new coloring-matter dyes unmordanted and chrome-mordanted wool fast-green shades.

Having now described my invention and in what manner the same is to be performed, what I claim as new, and desire to secure by Letters Patent, is—

1. The process for producing new anthraquinone dyestuffs which process consists in first treating with halogens the alphylmonoamidoanthraquinones of the general formula:

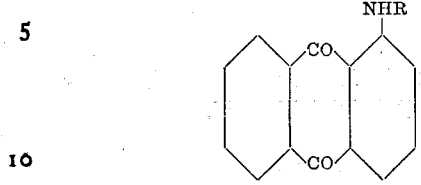

R meaning an aromatic radical, secondly treating the halogen derivatives thus obtained with aromatic amines, and finally transforming the resulting condensation products into dyestuff sulfonic acids by the action of sulfonating agents, substantially as hereinbefore described.

2. The process for producing a new anthraquinone dyestuff by first treating the alphatoluidoanthraquinone with bromine, secondly heating the brominated product thus obtained with paratoluidine, and finally transforming the resulting condensation product into a dyestuff sulfonic acid by the action of a mixture of sulfuric monohydrate and fuming sulfuric acid, substantially as hereinbefore described.

3. The herein-described new anthraquinone dyestuffs obtainable by sulfonating condensation products from halogen derivatives of alphylalphamonoamidoanthraquinones and aromatic amines which dyestuffs, when dry and pulverized, are dark powders dissolving in water and in ammonia with a green color, dyeing unmordanted and chrome-mordanted wool fast-green shades, substantially as hereinbefore described.

4. The herein-described specific anthraquinone dyestuff obtainable by sulfonating the condensation product of the brominated alphaparatoluidoanthraquinone with paratoluidine, representing, when dry and pulverized, a dark powder soluble in water with a bluish-green color, with difficulty in alcohol with a green color and being soluble in ammonia with a bluish-green color, being dissolved by concentrated sulfuric acid (of 66° Baumé) yielding a green solution the color of which does not change on the addition of a small quantity of ice, while on adding a larger quantity of ice a green precipitate is separated therefrom, dyeing unmordanted and chrome-mordanted wool fast-green shades, substantially as hereinbefore described.

In testimony whereof I have signed my name in the presence of two subscribing witnesses.

OSKAR UNGER.

Witnesses:
 OTTO KÖNIG,
 J. A. RITTERSHAUS.